(12) United States Patent
Yu

(10) Patent No.: US 7,866,867 B2
(45) Date of Patent: Jan. 11, 2011

(54) BACKLIGHTING OPTICAL FIBER, AND A LCD BACKLIGHT MODULE AND DISPLAY DEVICE FORMED THEREFROM

(75) Inventor: Chu-Yih Yu, Taipei (TW)

(73) Assignee: Taiwan Plastic Optical Fiber Co., Ltd., San Chung, Taipei County (TW)

( * ) Notice: Subject to any disclaimer, the term of this patent is extended or adjusted under 35 U.S.C. 154(b) by 0 days.

(21) Appl. No.: 12/382,080

(22) Filed: Mar. 9, 2009

(65) Prior Publication Data

US 2010/0226145 A1    Sep. 9, 2010

(51) Int. Cl.
*F21V 8/00*    (2006.01)
(52) U.S. Cl. .................. 362/560; 362/551; 385/146
(58) Field of Classification Search .......... 362/551, 362/560; 385/146
See application file for complete search history.

(56) References Cited

U.S. PATENT DOCUMENTS 6,550,952 B1 * 4/2003 Hulse et al. ................. 362/555
6,641,290 B2 * 11/2003 Ishiharada .................. 362/495
2005/0276064 A1 * 12/2005 Wu et al. .................... 362/555

FOREIGN PATENT DOCUMENTS

TW    M296373    8/2006

* cited by examiner

*Primary Examiner*—Laura Tso

(57) ABSTRACT

A backlighting optical fiber consists essentially of an optical fiber with an axially recess disposed along the inner wall; a reflector set into said axially recess, said reflector includes a reflecting surface disposed on the inner side of said reflector, to reflect the incident light toward the opposite direction of said reflector and emitting outwardly. A backlight module formed therefrom comprises a plurality of said optical fibers parallel arranged on a plane surface of a substrate and a LCD display device includes said backlight module and a LCD display.

7 Claims, 6 Drawing Sheets

BACKLIGHTING OPTICAL FIBER, AND A LCD BACKLIGHT MODULE AND DISPLAY DEVICE FORMED THEREFROM

FIELD OF THE INVENTION

The present invention relates to a backlighting optical fiber, and a backlight module and a LCD display device that formed from said optical fiber.

DESCRIPTION OF PRIOR ART

Optical fiber is a Hi-Tech product originally used as a medium for telecommunication, transmitting digital signals. However, as technology advances as speed of light, optical fiber of today is not only transmitting invisible 0 and 1, but also transmitting visible light, adopted for illumination, decoration, advertising and other area, bring more vivid colors into our ordinary life.

Generally speaking, optical fiber is a waveguide made of glass or plastic. Glass optical fiber is a high cost, low attenuation media, which is usually used for transmitting video or long distance telecommunication, such as the endoscope used for surgery. In contrary, plastic optical fiber is a low cost, high attenuation media, suitable for using in illuminating applications.

Conventional illuminating plastic optical fiber is commonly side-illuminated, by manipulating the exterior layer of the optical fiber, creating reflecting points or planes to guide the light outwardly from the side of the optical fiber. However, to reach side-lighting feature, an extra treatment is needed during the manufacture which complicates the manufacturing procedure and increase the cost. Furthermore, when light is seeping from the side of the optical fiber, it will guide the light out from undesirable areas, causing unnecessary waste of the energy and reducing the function as expected.

In cited reference TW M296373, entitled "Improvement in plastic optical fiber" of BAYCOM OPTO-ELECTRONICS TECHNOLOGY CO., LTD., which the abstract thereof is translated into English as following:

"A plastic optical fiber comprises an optical conduit and a light diffusion layer, said light diffusion layer is set on the inner wall of said optical conduit to reflect the incident light and emit the light outwardly. Said plastic optical fiber enhances side light luminance of a specific area of the optical conduit, simplifies the manufacture procedure, lowers the cost and provide functions for decoration or indication."

As disclosed aforementioned, BAYCOM discloses an improved plastic optical fiber structure which does not require extra treatment as mention prior art. However, the plastic optical fiber as claimed in the cited reference still possesses following drawbacks:

1. A light diffusion layer installed around the inner wall of said optical fiber can reflect the incident light, however, said diffusion layer will diffuse the light, degrading the luminance of the optical fiber.
   Therefore, to improve the luminance of the optical fiber becomes the primary object of the present invention.
2. Lower light concentration of said optical fiber diminishes the illumination effect of the optical fiber, limiting the application areas of the optical fiber.
   Therefore, to improve light concentration and increase application areas thereof become another objective of the present invention.
3. A reflecting plate is needed when said optical fiber is adopted for a backlight module to accomplished the standard performance. Therefore, to provide an optical fiber with better illuminating efficiency and no reflecting plate required is the other object of the present invention.

SUMMARY OF THE INVENTION

The present invention is to provide a low-cost and high efficiency backlighting optical fiber and backlight module and LCD display device adopt said optical fiber.

The present invention discloses a backlighting optical fiber, a backlight moduleand a LCD display device formed therefrom.

A backlighting optical fiber (100) comprises: an optical fiber (1) with a recess (11A~11F) axially disposed along the inner wall; and a reflector (2A~2F) set into said recess (11A~11F), said reflector (2A~2F) includes a reflecting surface (21A~21F) disposed on the inner side of said reflector (2A~2F), to reflect the incident light (L) to the opposite direction thereof.

Said optical fiber (1) can be made of following materials: acrylic resin, fluorinated resin, fluororesin, polymethyl methacrylate, metallocene cyclo-olefin copolymer, polycarbonate (PC), polystyrene (PS) and silica ($SiO_2$).

Said reflector (2A~2F) can be made of following materials: acrylic resin, fluorinated resin, fluororesin, polymethyl methacrylate, metallocene cyclo-olefin copolymer, polycarbonate (PC), polystyrene (PS) and silica ($SiO_2$)

The shape of said reflecting surface (21A~21F) is selected from one of following: a concave surface with curvature less than 180 degree, a convex surface with curvature less than 180 degree, a concave surface with curvature equal to 180 degree, a convex surface with curvature equal to 180 degree, a concave surface with curvature more than 180 degree and a convex surface with curvature more than 180 degree.

Said reflector (2A~2F) as disclosed above is a non-transparent reflecting bar or a reflecting bar applied with a high reflectivity layer.

A backlighting module (200), as disclosed in the present invention comprises: a substrate (4); pluralities of plastic optical fibers (100) as disclosed above, arranged in a plane parallel formation on top of said substrate (4); and at least one illuminating device (3), connected to said plastic optical fibers (100) for providing illumination.

Said illuminating device (3) can be selected from one of following: a laser diode (LD), a light-emitting diode (LED) or a SMD light-emitting diode (SMD-LED).

The material of said substrate (4) can be selected from following: flexible plastic, rigid plastic, glass or polymenthl methacrylate (PMMA).

A LCD display device (300), as disclosed in the present invention comprises: a backlight module (200); and a LCD display (400), disposed on top of said backlight module (200); said backlight module (200) comprises a substrate (4), pluralities of plastic optical fibers (100) as disclosed above, arranged in parallel on a plane top of said substrate (4); and at least one illuminating device (3), connected to said plastic optical fibers (100) for providing illumination.

COMPARISON WITH THE PRIOR ART

1. By coupling the optical fiber (1) with a reflector (2A~2F), an incident light (L) guided into the optical fiber (1) is reflected and emits light outwardly from the opposite side of the reflector (2A~2F), improve the side-lighting effect and reach the maximum illuminating efficiency.
2. Since the reflector (2A~2F) is impervious to light, no light is seeping from the side of the reflector (2A~2F) as the prior art, which will increase the light brightness, and make the present invention more suitable as backlighting light source. Better light concentration and controllable illuminating direction increase the economic value of the present invention.

3. No reflecting plate is required for the backlight module (200) which formed from said backlighting optical fiber (100); it can reduce the thickness of the module, lower the cost and time of manufacture. The simplified structure of said module reduces the weight and improves the cooling of the module, providing a more reliable and durable service.

DETAIL DESCRIPTION OF THE PREFERRED EMBODIMENT

The description is described in detail according the appended drawings hereinafter.

Figure 1:
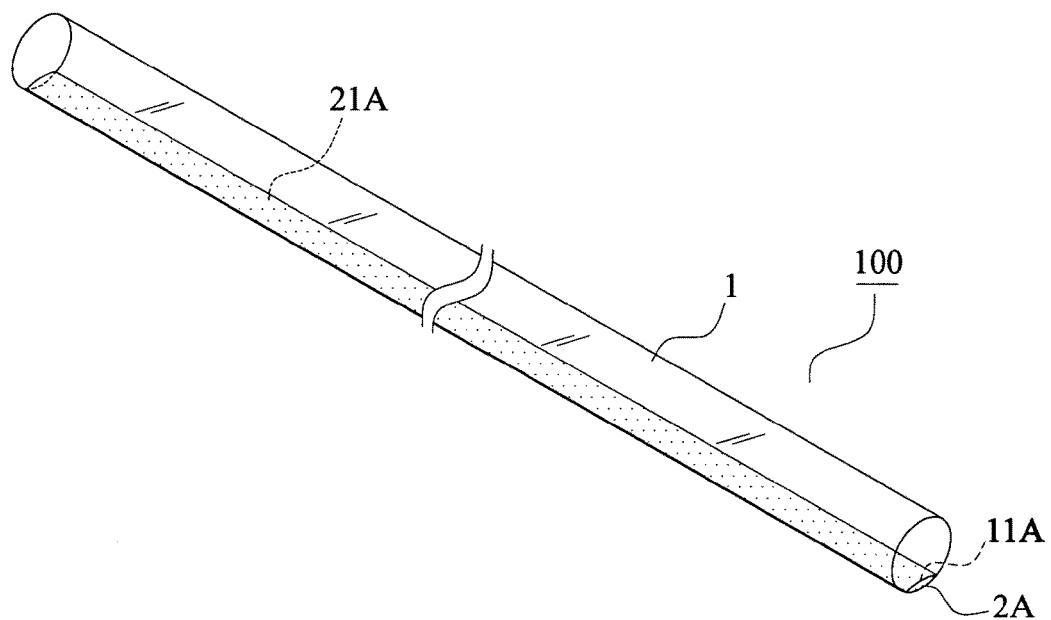
FIG. 1: shows a schematic view of the first embodiment of the present invention.
Figure 2:
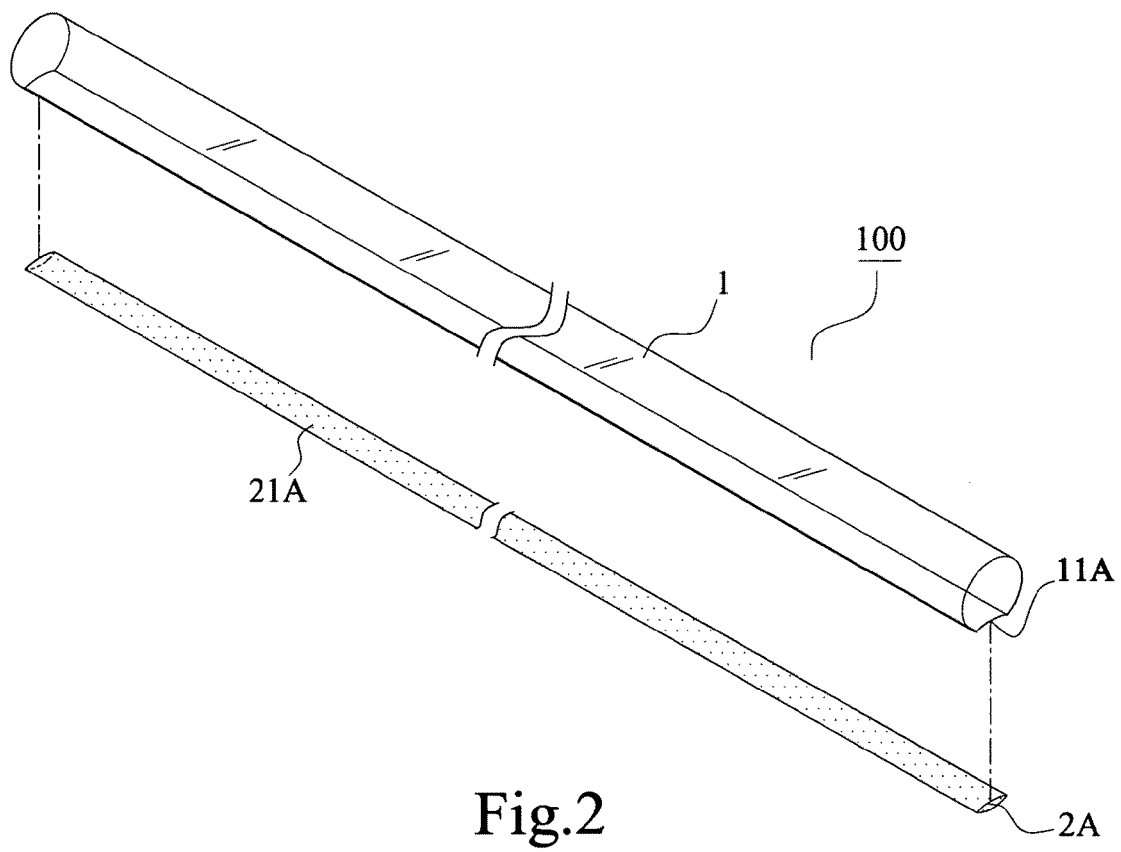
FIG. 2: shows an exploded view of the first embodiment of the present invention.
Figure 3:
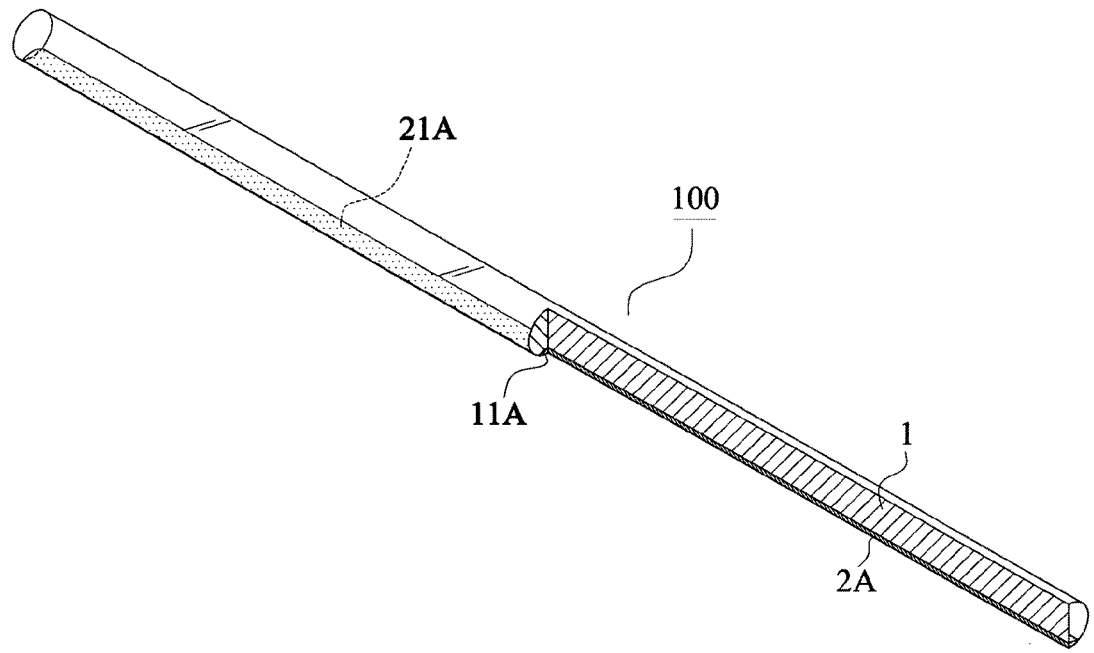
FIG. 3: shows a cutaway view of the first embodiment of the present invention.

FIG. 1 is a schematic view of the first embodiment of the present invention; FIGS. 2 and 3 are exploded view and cutaway view thereof; FIGS. 5~9 are schematic views of the second to sixth embodiments of the present invention.

As illustrated in FIGS. 13 and 5~9, a backlighting optical fiber (100) comprises: an optical fiber (1) with a recess (11A~11F) axially disposed along the inner wall; and a reflector (2A~2F) set into said recess (11A~11F), said reflector (2A~2F) includes a reflecting surface (21A~21F) disposed on the inner side of said reflector (2A~2F), to reflect an incident light (L) to the opposite direction thereof.

Said optical fiber (1) can be made of following materials: acrylic resin, fluorinated resin, fluororesin, polymethyl methacrylate, metallocene cyclo-olefin copolymer, polycarbonate (PC), polystyrene (PS) and silica ($SiO_2$). Said materials are commonly utilized for manufacturing optical fiber, the body of the optical fiber of the present invention can be manufactured by above materials depending required cost, application or illumination effect.

Said reflector (2A~2F) can be made of following materials: acrylic resin, fluorinated resin, fluororesin, polymethyl methacrylate, metallocene cyclo-olefin copolymer, polycarbonate (PC), polystyrene (PS) and silica ($SiO_2$). Since the reflector (2A~2F) will be coupled with the optical fiber (1) by integrate modeling, both materials for reflector (2A~2F) and optical fiber (1) must be the same material to prevent any detachment during the usage to reduce the defect ratio.

The shape of said reflecting surface (21A~21F) is selected from one of following: a concave surface with curvature less than 180 degree, a convex surface with curvature less than 180 degree, a concave surface with curvature equal to 180 degree, a convex surface with curvature equal to 180 degree, a concave surface with curvature more than 180 degree and a convex surface with curvature more than 180 degree. Different curvature of the reflecting surface (21A~21F) is selected depending required light luminance. Relating luminance and illuminating areas of different curvatures are described as following:

Reflecting surface (21A) of the reflector (2A), a concave surface with curvature less than 180 degree will illuminate diffusive light with narrower lighting area.

Reflecting surface (21B) of the reflector (2B), a concave surface with curvature equal to 180 degree will illuminate diffusive light with wider lighting area.

Reflecting surface (21C) of the reflector (2C), a concave surface with curvature more than 180 degree will illuminate diffusive light with maximum lighting area.

Reflecting surface (21D) of the reflector (2D), a convex surface with curvature less than 180 degree will illuminate concentrated light with narrower lighting area.

Reflecting surface (21E) of the reflector (2E), a convex surface with curvature equal to 180 degree will illuminate concentrated light with wider lighting area.

Reflecting surface (21F) of the reflector (2F), a convex surface with curvature more than 180 degree will illuminate concentrated light with maximum lighting area.

Said reflector (2A~2F) is a non-transparent reflecting bar which provides sufficient reflectivity to the reflecting surface (2A~2F), improving the side-lighting effect. Said reflector (2A~2F) may also be a reflecting bar applied or attached with a high reflectivity reflecting layer (not shown). The high reflectivity reflecting layer may also reflect the ambient light, increasing the luminance of the optical fiber when is applied to a open ambient.

Figure 4:
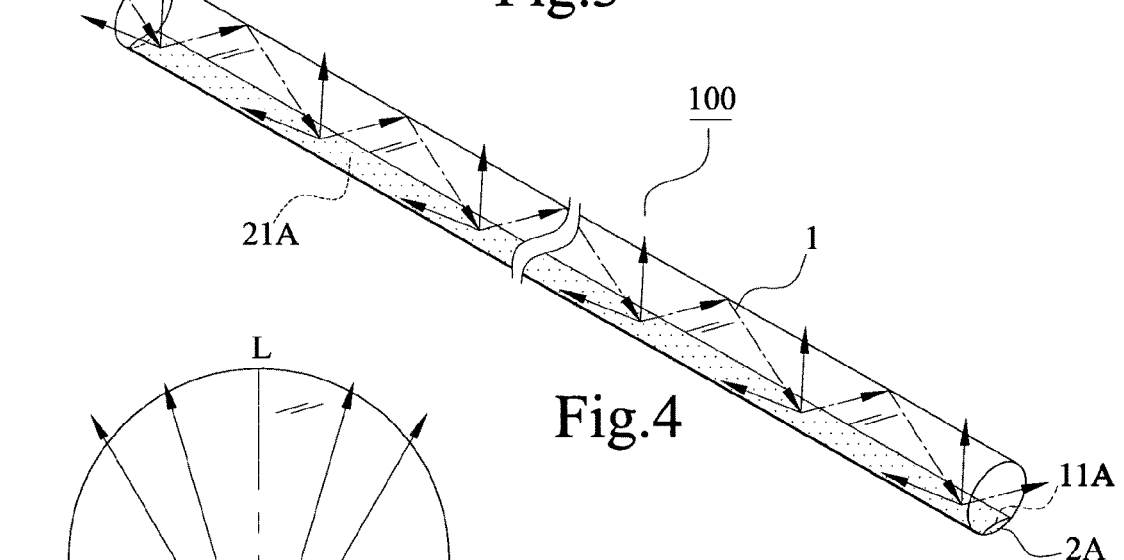
FIG. 4: shows a schematic view of the first embodiment of the present invention in use.
Figure 4A:
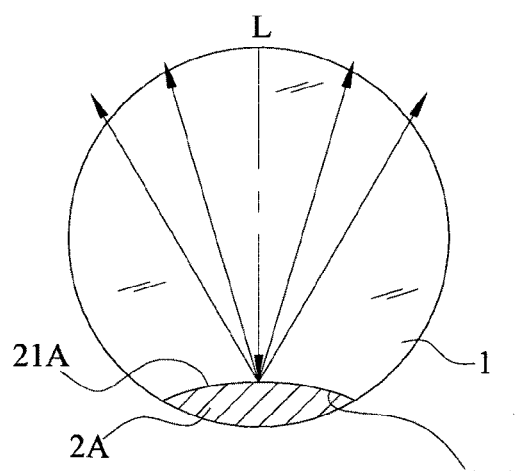
FIG. 4A: shows a sectional view of the first embodiment of the present invention from the extreme end.
Figure 5:
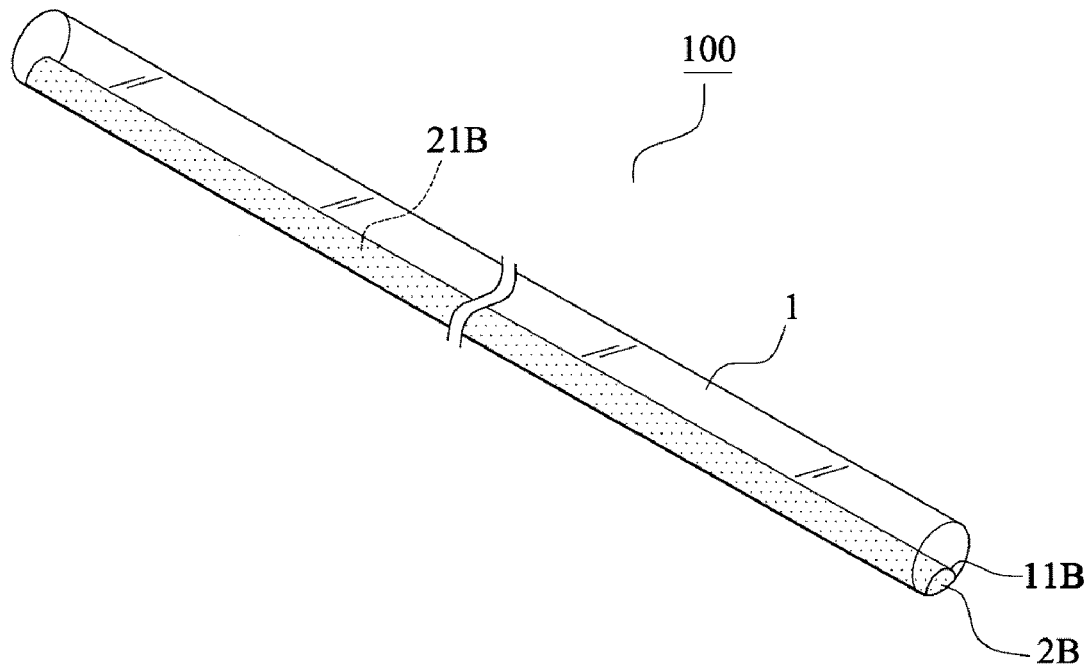
FIG. 5: shows a schematic view of the second embodiment of the present invention.
Figure 6:
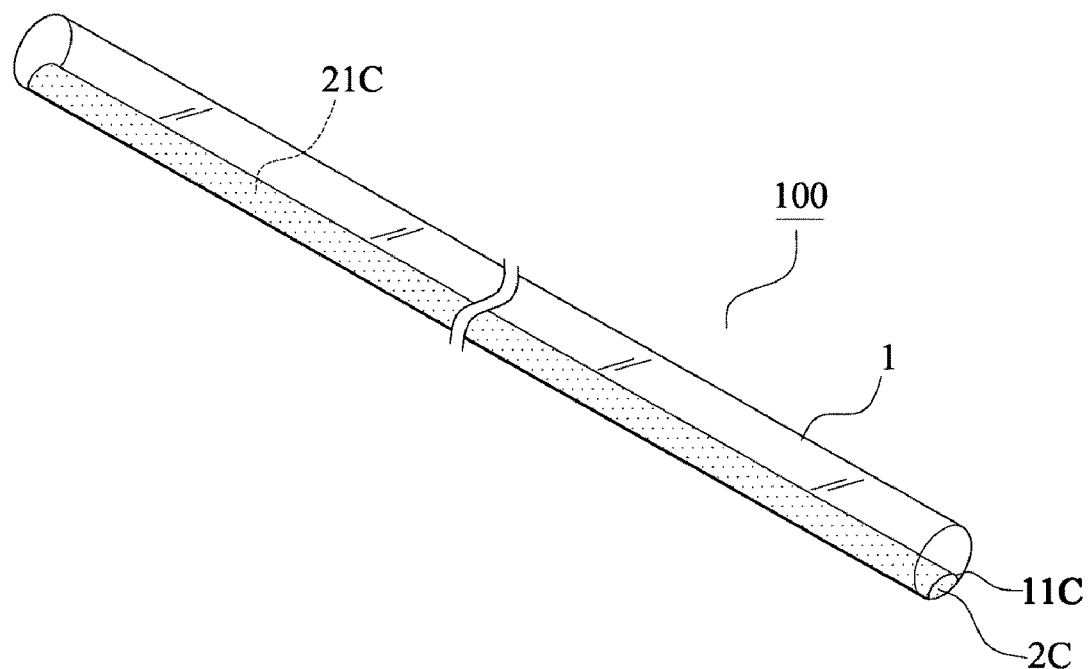
FIG. 6: shows a schematic view of the third embodiment of the present invention.
Figure 7:
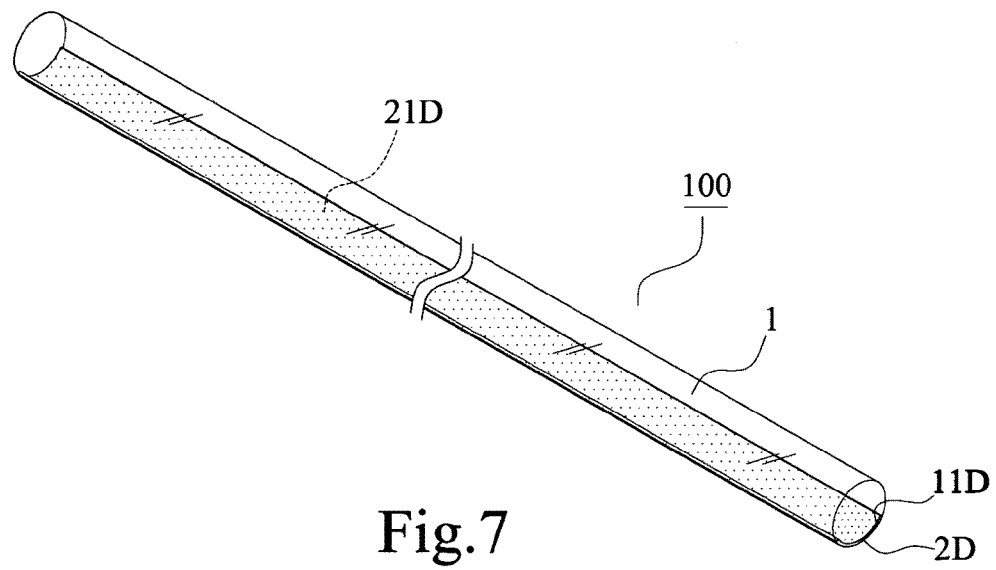
FIG. 7: shows a schematic view of the forth embodiment of the present invention.
Figure 8:
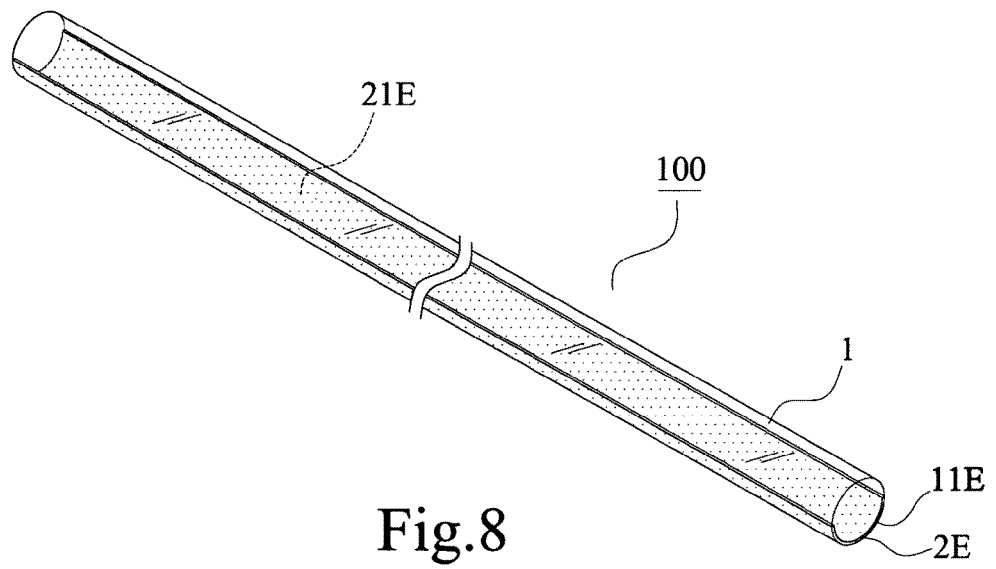
FIG. 8: shows a schematic view of the fifth embodiment of the present invention.
Figure 9:
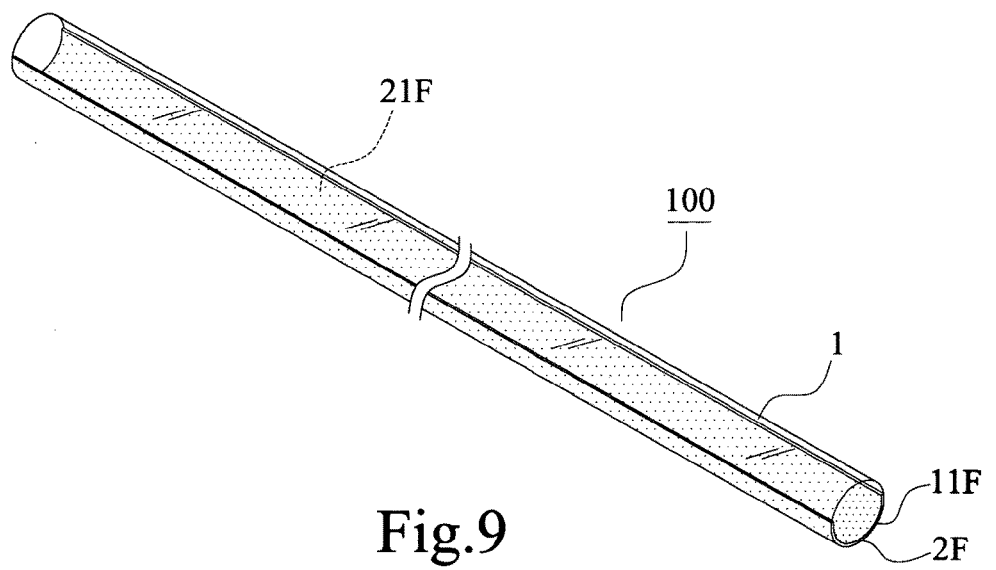
FIG. 9: shows a schematic view of the sixth embodiment of the present invention.

FIG. 4 is a schematic view of the first embodiment of the present invention in use and FIG. 4A is a sectional view of the first embodiment of the present invention from the extreme end.

As shown in the FIGS. 4 and 4A, an incident light (L) is guided into the optical fiber (1), a total internal reflection is occurred by the high refractivity of the optical fiber (1), causing the incident light (L) being transmitted inside the optical fiber (1). The high reflective reflector (2A) reflects partial of the incident light (L) toward the opposite side of the reflector (2A) and makes the optical fiber glow.

The backlighting optical fiber (100) of the present invention possesses features of energy saving, non-conductive, rapid-cooling, easy maintenance and water-proof. It is also high illuminating efficiency, providing bright lighting effect with minimum power consumption. The centralized illumination makes the optical fiber appropriate for backlighting light source, either general or industrial purpose.

Figure 10:
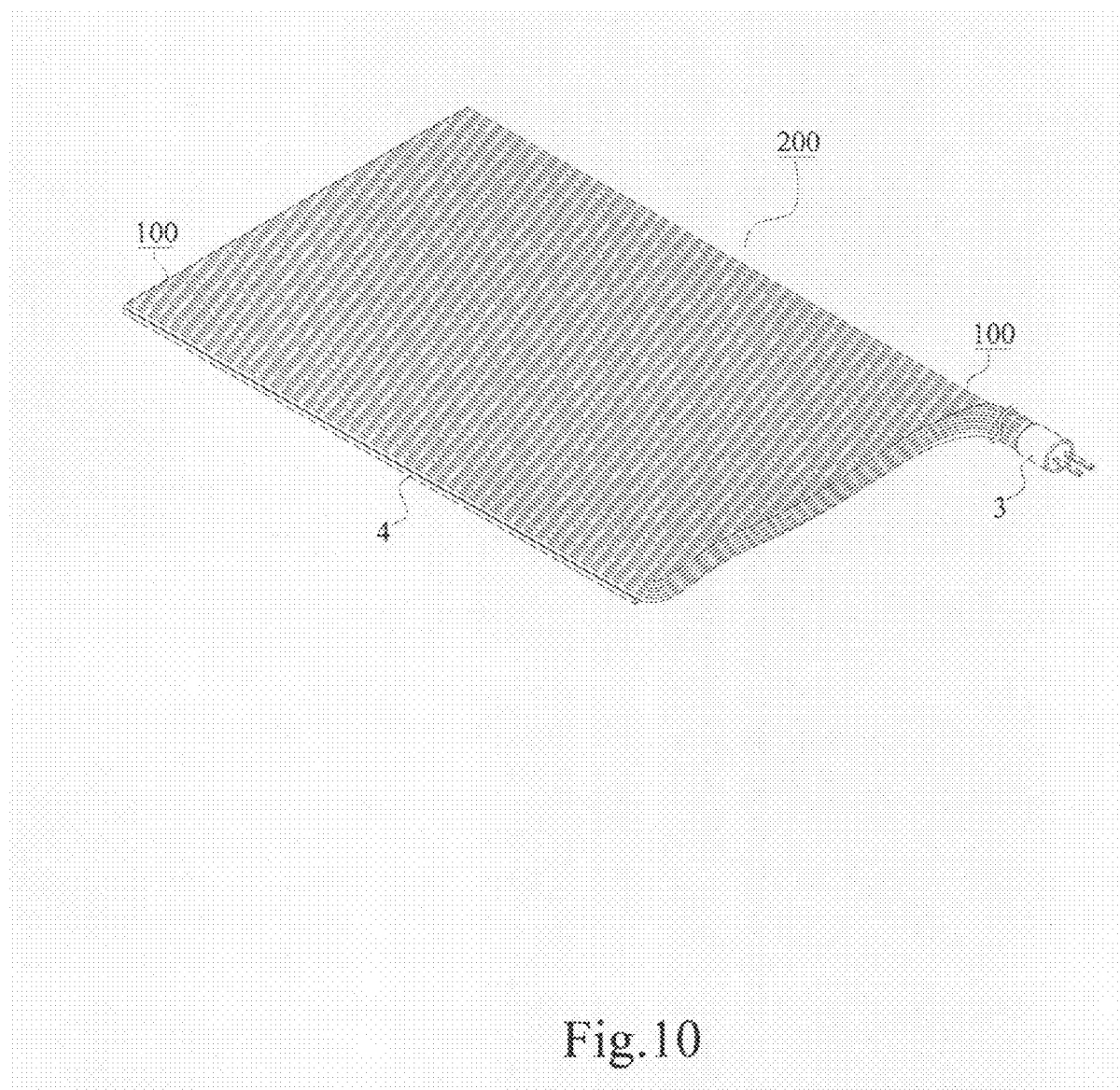
FIG. 10: shows a schematic view of a backlight module adopts the present invention.

FIG. 10 shows a schematic view of a backlight module formed from the present invention. A backlight module (200) comprises: a substrate (4); pluralities of backlighting optical fibers (100) arranged in parallel on the plane top of said substrate (4); and at least one illuminating device (3), connected to said backlighting optical fibers (100) for providing illumination. Each backlighting optical fiber (100) is a light stream and pluralities of backlighting optical fiber (100) arranged as described above can produce a lighting surface which can replace the conventional backlighting system created by cold cathode fluorescent lamps (CCFL) with a light guide plate. The thickness of said backlight module (200) can be reduced from 3~4 mm to 0.15~0.4 mm, which allows manufacturing thinner and lighter LCD display. When the backlighting optical fiber (100) and the substrate (4) are manufactured by flexible materials, the backlight module (200) will also be provided with flexibility, allowing the LCD display having properties of a paper, being light-weight and foldable. Said backlight module (200) also consumes less power than the conventional CCFL, the backlight module (200) made by backlighting optical fiber (100) can reduces its power consumption up to 5 W while each Watt less in power consumption extends 30~45 minutes of usage time, with less in size and longer usage time, the present invention gives the product with more competitive power.

Said backlighting optical fiber (100) further includes following advantages:
 1. High safety.
 2. Energy-saving.
 3. Low temperature.
 4. Even luminance.
 5. Longer durability.
 6. Low cost.
 7. Brighter side-lighting effect.

The light source of said illuminating device (3) can be selected from following: laser diode (LD), light emitting diode (LED) or SMD LED. The backlight module (200) installed with said light sources has better color reducibility, longer durability, and is also energy saving and eco-friendly, with more vivid colors whose gamut can reach to 108%.

The material of said substrate (4) can be selected from: flexible plastic, rigid plastic, glass or PMMA. The material is selected to adapt the required feature and application area of the backlight module (200) to achieve best economic benefit. For example, a soften plastic is selected for manufacturing electronic paper, a rigid plastic is suitable for mid/small size display and acrylic or glass is for large size.

Figure 11:
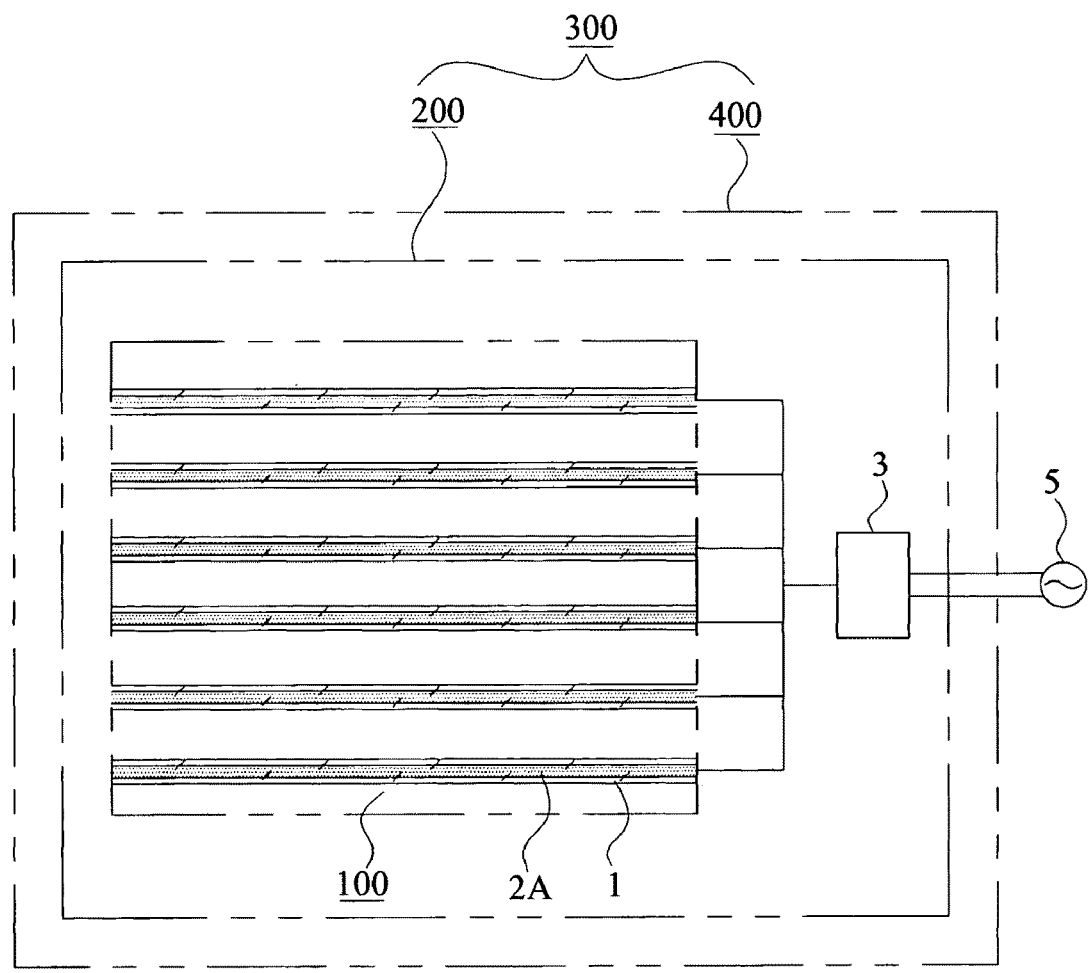
FIG. 11: shows a schematic view of a LCD display device adopts the backlight module of FIG. 10.

FIG. 11 illustrates a schematic view of a LCD display device (300) formed from said backlight module (200) as disclosed above. A LCD display device (300) consists a backlight module (200); and a LCD display (400) disposed on top of said backlight module (200); said backlight module (200) comprises a substrate (4), pluralities of optical fibers (100) as claimed in claim 1, closely arranged in parallel on a plane surface of said substrate (4); and at least one illuminating device (3), connected to said optical fibers (100) for emitting illumination.

Said illuminating device (3) transforms the electric power supply (5) into a light source and guides the light into said backlight module (200), producing illumination of the backlighting optical fiber (100) and provide proper function of the LCD display device (300) by connected to a LCD display (400).

Said backlighting optical fiber (100) can be utilized as light guiding element. As disclosed above, the present invention includes a reflector within, therefore, no extra reflecting board is needed to be installed on the backlight module (200), said design reduces the weight and the thickness of the LCD display device (300); it also simplifies the structure and lowers the cost. The energy-saving feature of the optical fiber reduces the power consumption of the illuminating device (3), gives the LCD screen and backlight module manufactured from the present invention more advantage than the prior arts.

The above description is that of preferred embodiments of the present invention. Various alterations and changes can be made without departing from the spirit and broader aspects of the invention as defined in the appended claims, which are to be interpreted in accordance with the principles of patent law including the doctrine of equivalents.

What is claimed is:

1. A LCD display device (300) comprising:
  a backlight module (200); and
  a LCD display (400), disposed on top of said backlight module (200); said backlight module (200) comprises a substrate (4), pluralities of optical fibers (100) closely arranged in parallel on a plane surface of said substrate (4); and at least one illuminating device (3), connected to said optical fibers (100) for providing illumination,
  said backlighting optical fiber (100) comprising:
    an optical fiber (1) with a recess (11A~11F) axially disposed along the inner wall; and
    a reflector (2A~2F) set into said recess (11A~11F), said reflector (2A~2F) includes a reflecting surface (21A~21F) disposed on the inner side of said reflector (2A~2F), to reflect the incident light (L) to the opposite direction of said reflector (2A~2F);
  the shape of said reflecting surface (21A~21F) is one of following: a concave surface with curvature less than 180 degree, a convex surface with curvature less than 180 degree, a concave surface with curvature equal to 180 degree, a convex surface with curvature equal to 180 degree, a concave surface with curvature more than 180 degree and a convex surface with curvature more than 180 degree.

2. A backlighting optical fiber (100) of claim 1 wherein said optical fiber (1) is made by one of following materials: acrylic resin, fluorinated resin, fluororesin, polymethyl methacrylate, cyclo-olefin polymer, polycarbonate (PC), polystyrene (PS) and silica ($SiO_2$).

3. A backlighting optical fiber (100) of claim 1 wherein said reflector (2A~2F) is made by one of following materials: acrylic resin, fluorinated resin, fluororesin, polymethyl methacrylate, cyclo-olefin polymer, polycarbonate (PC), polystyrene (PS) and silica ($SiO_2$).

4. A backlighting optical fiber (100) of claim 1 wherein said reflector (2A~2F) is a non-transparent reflecting bar.

5. A backlighting optical fiber (100) of claim 1 wherein said reflector (2A~2F) is a reflecting bar applied with a high reflectivity layer.

6. A backlight module (200) of claim 1 wherein said illuminating device (3) is one of following: laser diode (LD), light-emitting diode (LED) and SMD light-emitting diode (SMD-LED).

7. A backlight module (200) of claim 1 wherein the material of said substrate (4) is one of following: flexible plastic, rigid plastic, glass or acrylic.

* * * * *